US012766880B2

(12) United States Patent
Takada et al.

(10) Patent No.: US 12,766,880 B2
(45) Date of Patent: Oct. 20, 2026

(54) WHEEL BEARING DEVICE

(71) Applicant: JTEKT CORPORATION, Kariya (JP)

(72) Inventors: Yoshito Takada, Nara (JP); Takanobu Murakami, Toyota (JP)

(73) Assignee: JTEKT CORPORATION, Kariya (JP)

( * ) Notice: Subject to any disclaimer, the term of this patent is extended or adjusted under 35 U.S.C. 154(b) by 411 days.

(21) Appl. No.: 18/289,257

(22) PCT Filed: Jun. 10, 2021

(86) PCT No.: PCT/JP2021/022104

§ 371 (c)(1),
(2) Date: Nov. 2, 2023

(87) PCT Pub. No.: WO2022/259460

PCT Pub. Date: Dec. 15, 2022

(65) Prior Publication Data

US 2025/0003451 A1 Jan. 2, 2025

(51) Int. Cl.

*B60B 27/00* (2006.01)
*F16C 19/18* (2006.01)
*F16C 35/06* (2006.01)

(52) U.S. Cl.

CPC .......... *B60B 27/00* (2013.01); *B60B 27/0005* (2013.01); *B60B 27/0094* (2013.01); *F16C 19/18* (2013.01); *F16C 35/06* (2013.01); *F16C 2326/02* (2013.01)

(58) Field of Classification Search

CPC ...... F16C 35/042; F16C 35/045; F16C 35/06; B60B 27/00; B60B 27/0005; B60B 27/0094

See application file for complete search history.

(56) References Cited

U.S. PATENT DOCUMENTS 8,534,924 B2 * 9/2013 Zwarts ................ F04C 18/0269 301/105.1
9,457,619 B2 * 10/2016 Nervo ....................... B60B 5/02
10,464,370 B2 * 11/2019 Stahl ....................... B60B 27/00

(Continued)

FOREIGN PATENT DOCUMENTS

JP 2011-207298 A 10/2011
JP 2014-121903 A 7/2014

(Continued)

OTHER PUBLICATIONS

Aug. 24, 2021 International Search Report issued in International Patent Application No. PCT/JP2021/022104.

*Primary Examiner* — Jason R Bellinger
(74) *Attorney, Agent, or Firm* — Oliff PLC

(57) ABSTRACT

A bearing device includes: an outer ring; an inner member including, a flange portion having a plurality of bolt holes and a tapped hole; and a plurality of rolling elements arranged between the outer ring and inner member. The flange portion includes portions of a first thickness located in a first region having a through hole extending through the first region in the axial direction and having no tapped hole, and in a second region having the tapped hole. The flange portion also includes a portion of a second thickness, greater than the first thickness, including regions around the bolt holes, and a portion of a third thickness, greater than the first thickness, around the tapped hole.

7 Claims, 9 Drawing Sheets

(56) References Cited

U.S. PATENT DOCUMENTS

| | | | | |
|---|---|---|---|---|
| 11,446,957 | B2 * | 9/2022 | Kraus | B60B 27/00 |
| 2011/0127826 | A1 * | 6/2011 | Krabill | B60B 27/00 301/6.8 |
| 2013/0062929 | A1 * | 3/2013 | Onizuka | B60B 27/0005 301/109 |
| 2014/0175862 | A1 | 6/2014 | Anno et al. | |
| 2019/0105946 | A1 | 4/2019 | Takanashi | |
| 2020/0031164 | A1 | 1/2020 | Anno | |

FOREIGN PATENT DOCUMENTS

| | | | |
|---|---|---|---|
| JP | 2017-190865 | A | 10/2017 |
| JP | 2018-034775 | A | 3/2018 |
| JP | 2019-084900 | A | 6/2019 |
| JP | 2020-015398 | A | 1/2020 |
| JP | 2021-030769 | A | 3/2021 |

* cited by examiner

Prior Art

WHEEL BEARING DEVICE

TECHNICAL FIELD

The present disclosure relates to wheel bearing devices.

BACKGROUND ART

A wheel bearing device called a hub unit is used to attach a wheel and a brake disc to a vehicle body of a motor vehicle (see, for example, Patent Document 1). The wheel bearing device includes an inner shaft having a flange portion for mounting the wheel etc. FIG. 9 is a perspective view of a conventional inner shaft 90. As shown in FIG. 9, the inner shaft 90 in the conventional wheel bearing device has a shaft-shaped body portion 91 and a flange portion 92 located on one side in the axial direction of the body portion 91. The flange portion 92 has a plurality of bolt holes 93 for mounting the wheel (not shown).

The flange portion 92 has: a flange base portion 95 continuous with the body portion 91 and having a circular cross section; a plurality of first thick portions 96 formed radially outward of the flange base portion 95 at equal intervals in the circumferential direction and having the bolt holes 93; and thin portions 97 each located between the first thick portions 96 and thinner than the first thick portions 96. The flange base portion 95 has second thick portions 98 located radially inward of the first thick portions 96 and thicker than the first thick portions 96.

When attaching a brake rotor (not shown) to the flange portion 92, it is necessary to temporarily fix the brake rotor with a bolt. Therefore, the flange portion 92 has a tapped hole 99 for fixing a temporary bolt. The tapped hole 99 is formed in a raised portion 94 of the flange portion 92 because the tapped hole 99 needs to have a sufficient fitting length with the bolt. Since the tapped hole 99 is formed in the raised portion 94, the tapped hole 99 is surrounded by a wall-like thick portion.

RELATED ART DOCUMENTS

Patent Documents

Patent Document 1: Japanese Unexamined Patent Application Publication No. 2020-15398 (JP 2020-15398 A)

SUMMARY OF THE INVENTION

Problem to be Solved by the Invention

In the conventional wheel bearing device shown in FIG. 9, the flange portion 92 has a thick portion (raised portion 94) only around the tapped hole 99. Therefore, when the brake rotor is temporarily fixed, the tapped hole 99 may be distorted due to the weight of the brake rotor. In the case where the flange portion 92 is provided with the raised portion 94 so that the tapped hole 99 has enough strength, it increases the weight of the inner shaft 90 and adversely affects the balance of the weight of the flange portion 92 in the circumferential direction.

It is an object of the present disclosure to allow a tapped hole to have enough strength while reducing an increase in weight of an inner shaft and balancing the weight of the inner shaft in the circumferential direction in a wheel bearing device.

Means for Solving the Problem

A wheel bearing device of the present disclosure includes: an outer member; an inner member including, on one side in an axial direction of the inner member, a wheel mounting flange having a plurality of bolt holes for fixing to a wheel and a tapped hole for fixing a brake rotor; and a plurality of rolling elements arranged between the outer member and the inner member. The wheel mounting flange includes: thin portions located in a first region that has a through hole extending through the first region in the axial direction and does not have the tapped hole and a second region that has the tapped hole, the first and second regions being regions each located between the bolt holes adjacent to each other in a circumferential direction; a first thick portion including regions around the bolt holes that are raised from the thin portions toward the other side in the axial direction; and a second thick portion that is a region around the tapped hole that is raised from the thin portion in the second region toward the other side in the axial direction.

Effects of the Invention

According to the wheel bearing device of the present disclosure, it is possible to allow the tapped hole to have enough strength while reducing an increase in weight of the inner member and balancing the weight of the inner member in the circumferential direction in the wheel bearing device.

MODES FOR CARRYING OUT THE INVENTION

Figure 1:
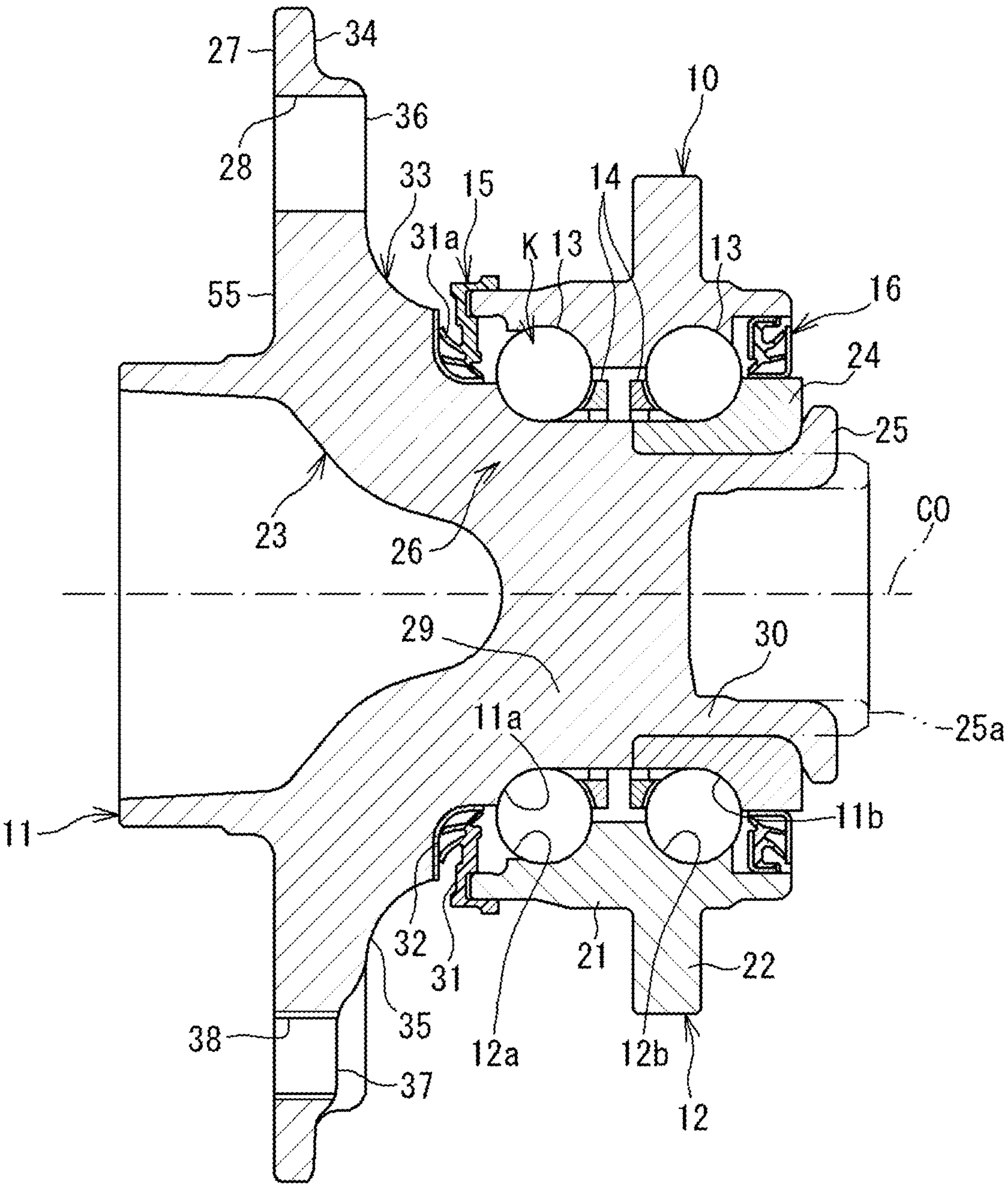
FIG. 1 is a sectional view showing an example of a wheel bearing device.

Overview of Embodiments of Invention of Present Disclosure

An overview of embodiments of the invention of the present disclosure will be provided below.

(1) A wheel bearing device of the present disclosure includes: an outer member; an inner member including, on one side in an axial direction of the inner member, a wheel mounting flange having a plurality of bolt holes for fixing to a wheel and a tapped hole for fixing a brake rotor; and a plurality of rolling elements arranged between the outer member and the inner member. The wheel mounting flange includes: thin portions located in a first region that has a through hole extending through the first region in the axial direction and does not have the tapped hole and a second region that has the tapped hole, the first and second regions being regions each located between the bolt holes adjacent to each other in a circumferential direction; a first thick portion including regions around the bolt holes that are raised from the thin portions toward the other side in the axial direction; and a second thick portion that is a region around the tapped hole that is raised from the thin portion in the second region toward the other side in the axial direction.

In the wheel bearing device having such a configuration, providing the second thick portion allows the tapped hole to have enough strength, and forming the through hole reduces an increase in weight of the wheel mounting flange and balances the weight of the wheel mounting flange in the circumferential direction. Therefore, according to such a configuration, it is possible to allow the tapped hole to have enough strength while reducing an increase in weight of the inner member and balancing the weight of the inner member in the circumferential direction in the wheel bearing device.

(2) In the wheel bearing device of the present disclosure, the first thick portion preferably includes: an annular base portion located on a radially inner side of the first thick portion; and protruding portions protruding radially outward in a radial pattern from the base portion, the protruding portions being the regions around the bolt holes that are raised from the thin portions toward the other side in the axial direction, and the second thick portion is preferably connected on both sides in the circumferential direction of the second thick portion to the protruding portions. With this configuration, the strength of the second thick portion can be increased. It is therefore possible to reduce distortion of the tapped hole that is caused by the weight of the brake rotor when the brake rotor is temporarily fixed to the wheel mounting flange.

(3) In the wheel bearing device of the present disclosure, the wheel mounting flange includes, as the thin portions in the first region, a first thin portion having a first through hole and a second thin portion having a second through hole with a smaller diameter than the first through hole. With this configuration, the weight of the wheel mounting flange can be balanced in the circumferential direction.

(4) In the wheel bearing device of the present disclosure, the wheel mounting flange preferably has two tapped holes, the first thin portion is preferably located on a side where a circumferential interval between the tapped holes is small, and the second thin portion is preferably located on a side where the circumferential interval between the tapped holes is large. With this configuration, the weight of the wheel mounting flange having the two tapped holes can be balanced in the circumferential direction.

(5) In the wheel bearing device of the present disclosure, the wheel mounting flange preferably has one tapped hole, and the second thin portion is preferably located farther away in the circumferential direction from the second thick portion than the first thin portion is. With this configuration, the weight of the wheel mounting flange having the one tapped hole can be balanced in the circumferential direction.

(6) In the wheel bearing device of the present disclosure, an axial dimension of the second thick portion is preferably smaller than an axial dimension of the first thick portion. With this configuration, an increase in weight of the wheel mounting flange can be reduced.

(7) In the wheel bearing device of the present disclosure, the second thick portion is preferably connected on a radially inner side of the second thick portion to the base portion. With this configuration, the strength of the second thick portion can further be increased.

Details of Embodiments of Invention of Present Disclosure

Hereinafter, the embodiments of the invention of the present disclosure will be described.

[Bearing Device]

FIG. 1 is a sectional view showing an example of a wheel bearing device. A wheel bearing device 10 (hereinafter referred to as "bearing device 10") shown in FIG. 1 is called a hub unit. The bearing device 10 is attached to a suspension device (knuckle) mounted on a vehicle body of a motor vehicle, and rotatably supports a wheel. Although not shown in the figure, a brake disk, in addition to the wheel, is attached to the bearing device 10. The bearing device 10 includes an inner member 11, a tubular outer ring (outer member) 12, balls 13 that are rolling elements, a cage 14, a first sealing device 15 provided on one side in the axial direction, and a second sealing device 16 provided on the other side in the axial direction. In the bearing device 10, the axial direction is a direction along the centerline CO of the bearing device 10, and a direction parallel to the centerline CO is also referred to as axial direction. The radial direction is a direction perpendicular to the centerline CO, and the circumferential direction is a direction of rotation about the centerline CO.

The outer ring 12 has a cylindrical outer ring body portion 21 and a fixing flange portion 22 extending radially outward from the outer ring body portion 21. Outer raceway surfaces **12*a*, 12*b* are formed on the inner peripheral side of the outer ring body portion 21. The outer ring 12 is attached to the knuckle (not shown) that is a vehicle body-side member by the flange portion 22. The bearing device 10 including the outer ring 12 is thus fixed to the vehicle body. With the bearing device 10 fixed to the vehicle body, the wheel mounting flange portion 27 side of the inner member 11, which will be described later, faces outside the vehicle. That is, the one side in the axial direction where the flange portion 27** is located is the vehicle outer side, and the opposite side, namely the other side in the axial direction, is the vehicle inner side.

The inner member 11 has an inner shaft (hub shaft) 23 and an inner ring 24 attached to the other side in the axial direction of the inner shaft 23. FIGS. 1 to 4 show the inner shaft 23 according to the first embodiment. In the following description, the inner shaft 23 according to the first embodiment will be referred to as first inner shaft 23A. When simply referred to as the "inner shaft 23" in the description, its description is about common configurations between the first inner shaft 23A and a second inner shaft 23B (see FIGS. 5 and 6) and a third inner shaft 23C (FIGS. 7 and 8) that will be described later.

The inner shaft 23 has a shaft-shaped body portion 26 located radially inward of the outer ring 12, and the flange portion (wheel mounting flange) 27 located on the one side in the axial direction of the body portion 26. The flange portion 27 has a plurality of bolt holes 28 for mounting the wheel. The inner shaft 23 further has a clinched portion 25 for preventing the inner ring 24 from slipping off toward the other side in the axial direction. The centerline of the inner shaft 23 coincides with the centerline CO of the bearing device 10. The flange portion 27 is provided so as to extend radially outward from the one side in the axial direction of the body portion 26. The wheel and a brake rotor (not shown) are attached to a surface on the one side in the axial direction of the flange portion 27 (flange surface 55). The clinched portion 25 is formed to have an increased diameter by plastic deformation of a cylindrical portion **25*a*. In FIG. 1, the cylindrical portion 25*a*** before the plastic deformation is shown by a long dashed double-short dashed line.

The outer peripheral surface of the body portion 26 has a stepped shape. That is, the body portion 26 has a first shaft portion 29 having an inner raceway surface **11*a*, and a second shaft portion 30 whose outer peripheral surface has a smaller diameter than that of the first shaft portion 29. With the inner ring 24 fitted onto the second shaft portion 30, the cylindrical portion 25***a* is plastically deformed to form the clinched portion 25 with an increased diameter. The inner ring 24 is thus sandwiched between the first shaft portion 29 and the clinched portion 25.

The inner ring 24 is an annular member and is fitted on and fixed to the second shaft portion 30. The first inner raceway surface 11*a* is formed on the outer peripheral surface of the first shaft portion 29, and a second inner raceway surface 11*b* is formed on the outer peripheral surface of the inner ring 24. A plurality of balls 13 is arranged between the outer raceway surface 12*a* and the inner raceway surface 11*a* that are located on the one side in the axial direction. A plurality of balls 13 is arranged between the outer raceway surface 12*b* and the inner raceway surface 11*b* that are located on the other side in the axial direction.

The inner shaft 23, the inner ring 24, the outer ring 12, and the balls 13 that are constituent members of the bearing device 10 are made of steel (carbon steel, bearing steel). The cage 14 may be made of steel, or may be made of resin.

An annular space K where the balls 13 are disposed is formed between the inner member 11 and the outer ring 12. The first sealing device 15 is provided on the one side in the axial direction of the annular space K, and the second sealing device 16 is provided on the other side in the axial direction of the annular space K. The sealing devices 15, 16 prevent foreign matter from outside from entering the annular space K. The first sealing device 15 has an annular seal member 31 attached to the outer ring 12 and an annular slinger 32 attached along a base portion 35, which will be described later, of the inner shaft 23. Part of the seal member 31 (lip portion 31*a*) contacts the slinger 32. The first sealing device 15 can thus prevent foreign matter from entering the annular space K from between the flange portion 27 and the outer ring 12.

(Inner Shaft According to First Embodiment)

Figure 2:
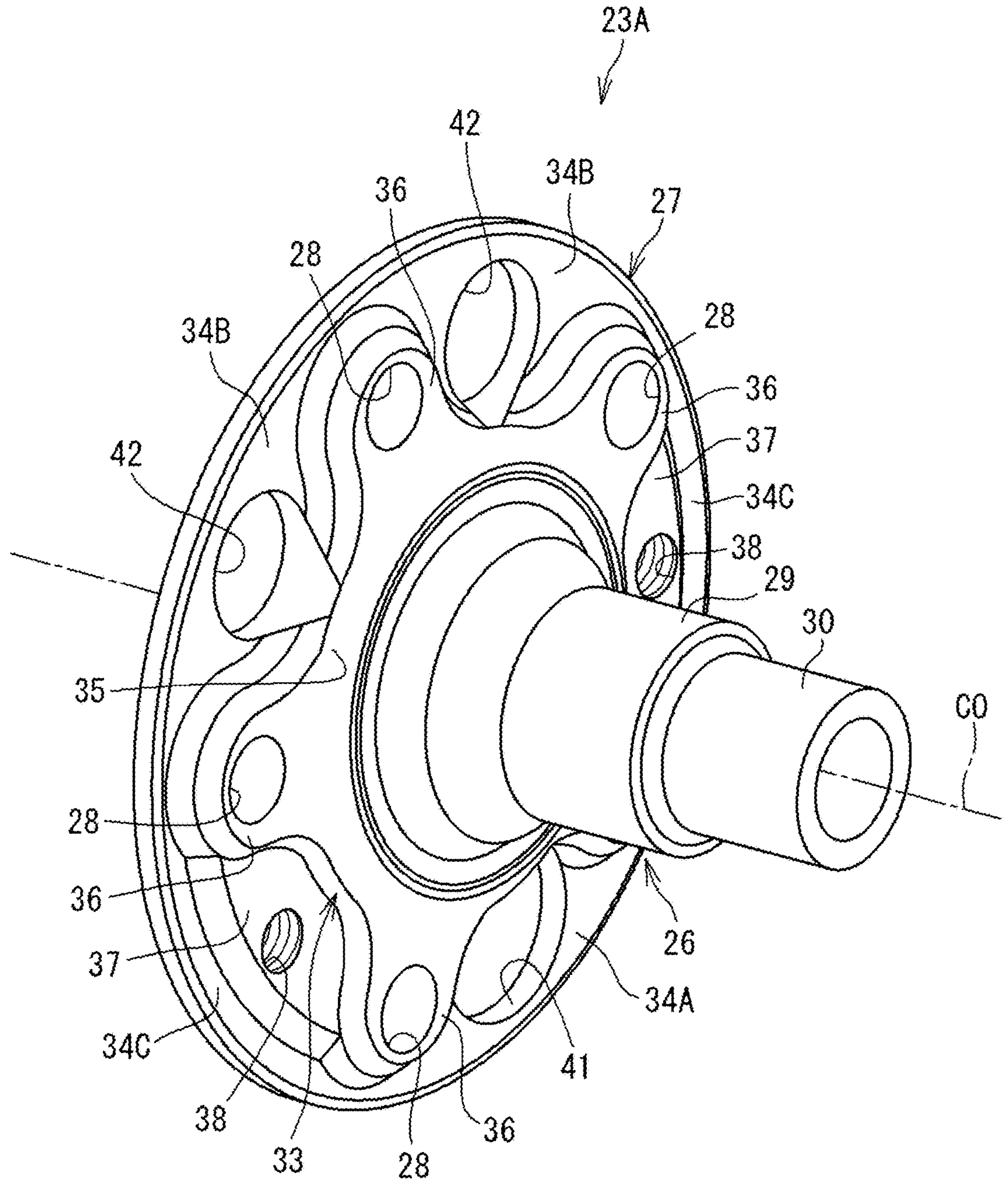
FIG. 2 is a perspective view of an inner shaft according to a first embodiment.
Figure 3:
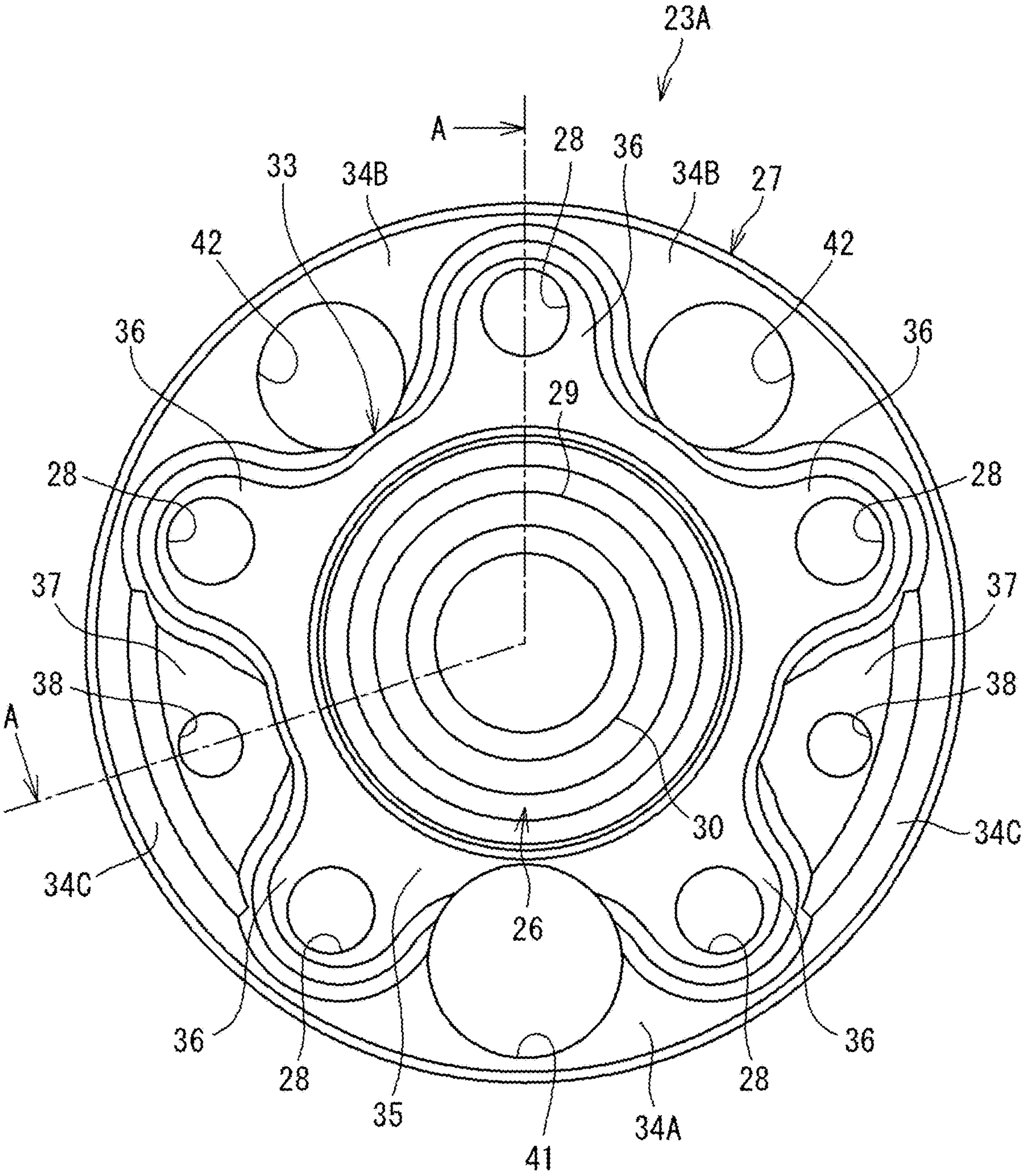
FIG. 3 is a diagram of the inner shaft according to the first embodiment as viewed in an axial direction.
Figure 4:
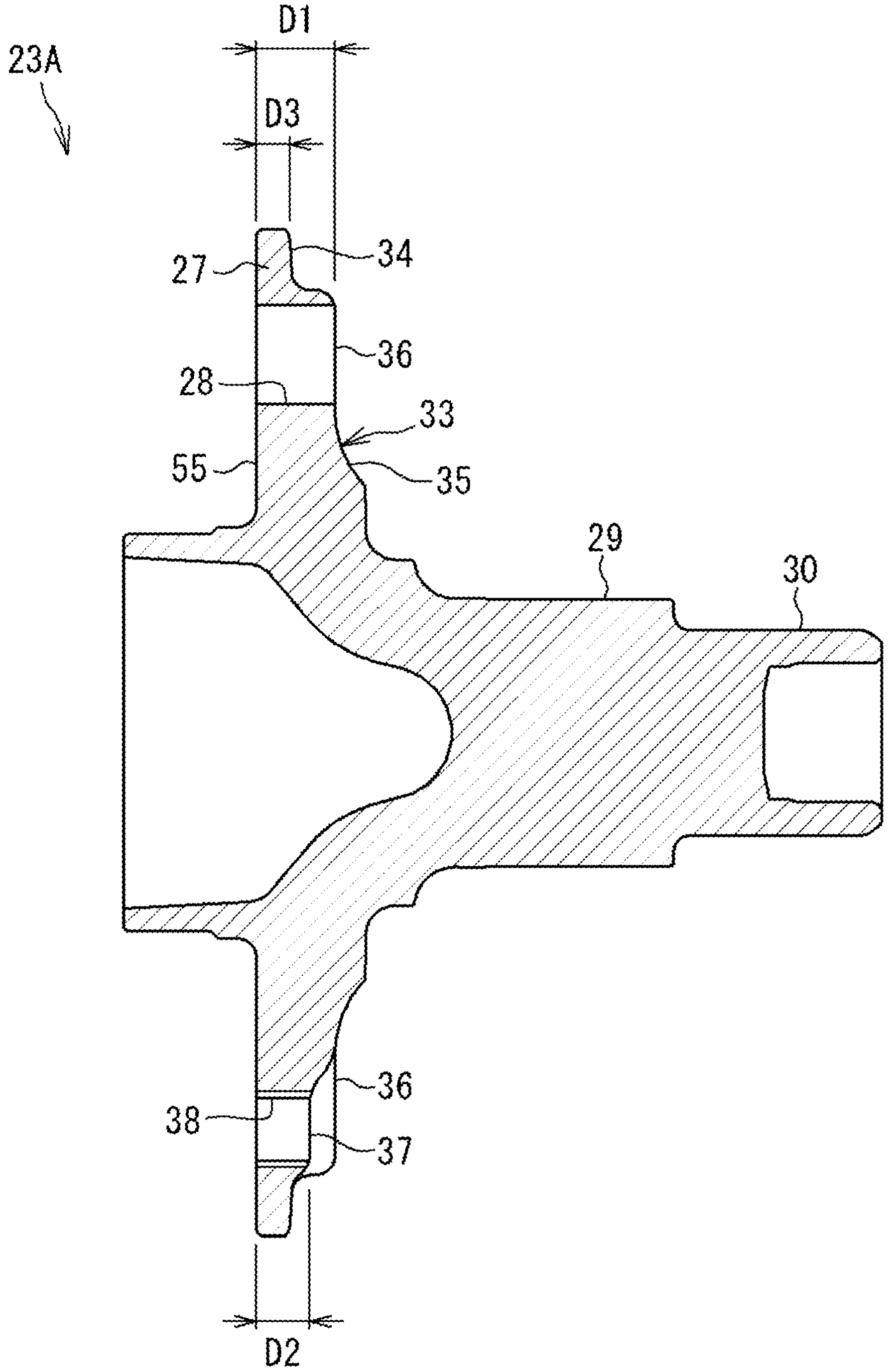
FIG. 4 is a sectional view taken along line A-A in FIG. 3

FIG. 2 is a perspective view of the inner shaft 23 (first inner shaft 23A) according to the first embodiment. FIG. 3 is a diagram of the first inner shaft 23A as viewed in the axial direction. FIG. 4 is a sectional view taken along line A-A in FIG. 3. As shown in FIGS. 2 to 4, in the first inner shaft 23A, the disc-shaped flange portion 27 has a first thick portion 33 on the radially inner side and a plurality of thin portions 34 on the radially outer side. The first thick portion 33 includes: the base portion 35 having a circular (in the present embodiment, annular) cross section perpendicular to the centerline CO; and a plurality of protruding portions 36 protruding radially outward in a radial pattern from the base portion 35. The base portion 35 is a radially inner part of the first thick portion 33. The protruding portions 36 are provided at equal intervals in the circumferential direction and have the bolt holes 28. In other words, the protruding portions 36 are regions around the bolt holes 28 that are raised from the thin portions 34 toward the other side in the axial direction. The first thick portion 33 includes the protruding portions 36 that are the regions around the bolt holes 28 raised from the thin portions 34 toward the other side in the axial direction. The protruding portions 36 are thinner than the base portion 35.

Each thin portion 34 is provided radially outward of the base portion 35 at a position between the protruding portions 36, 36 that are adjacent to each other in the circumferential direction. The thin portions 34 are thinner than the first thick portion 33. That is, the axial dimension D3 of the thin portions 34 is smaller than the axial dimension D1 of the first thick portion 33 (protruding portions 36) (see FIG. 4).

Since the bolt holes 28 are formed in the protruding portions 36, the number of protruding portions 36 is the same as the number of bolt holes 28 ("5" in the first inner shaft 23A). Since each thin portion 34 is provided between the protruding portions 36, 36 that are adjacent to each other in the circumferential direction, the number of thin portions 34 is the same as the number of protruding portions 36 ("5" in the first inner shaft 23A).

The flange portion 27 further includes second thick portions 37. The second thick portions 37 of the first inner shaft 23A are provided in two of the five thin portions 34. That is, a plurality of second thick portions 37 is formed in the flange portion 27 of the present embodiment. The second thick portions 37 are thinner than the first thick portion 33 and thicker than the thin portions 34. That is, the axial dimension D2 of the second thick portions 37 is smaller than the axial dimension D1 of the first thick portion 33 and larger than the axial dimension D3 of the thin portions 34 (D1>D2>D3, see FIG. 4).

The flange portion 27 further has tapped holes 38 in the second thick portions 37. The second thick portions 37 are regions around the tapped holes 38 that are raised from third thin portions 34C, which will be described later, toward the other side in the axial direction. The tapped holes 38 are used to temporarily fix the brake rotor, although not shown in the figures. The flange portion 27 of the first inner shaft 23A has two tapped holes 38. In other words, in the first inner shaft 23A, two second thick portions 37 are provided in order to form two tapped holes 38 in the flange portion 27. In the first inner shaft 23A, providing the second thick portions 37 allows the tapped holes 38 to have enough strength.

Each second thick portion 37 is connected on its both sides in the circumferential direction to the protruding portions 36 of the first thick portion 33. Such a second thick portion 37 has increased rigidity compared to the case where the second thick portion 37 is not connected on its both sides in the circumferential direction to the protruding portions 36. In the first inner shaft 23A having such a configuration, the rigidity of the tapped holes 38 is high enough to reduce distortion of the tapped holes 38 that is caused by the weight of the brake rotor, not shown, when the brake rotor is temporarily fixed to the flange portion.

Each second thick portion 37 is further connected on its radial inner side to the base portion 35 of the first thick portion 33. Such a second thick portion 37 has further increased rigidity compared to the case where the second thick portion 37 is not connected on its radial inner side to the base portion 35. In the first inner shaft 23A having such a configuration, it is possible to reliably reduce distortion of the tapped holes 38 that is caused by the weight of the brake rotor, not shown, when the brake rotor is temporarily fixed to the flange portion.

The flange portion 27 further has a plurality of through holes 40. The through holes 40 are holes formed in order to reduce the weight of the flange portion 27 and to balance the weight in the circumferential direction. The through holes 40 include a first through hole 41 and second through holes 42. The first through hole 41 and the second through holes 42 of the present embodiment are formed in the (three) thin portions 34 where the second thick portions 37 are not provided out of the five thin portions 34. In the first inner shaft 23A, the flange portion 27 has one first through hole 41 and two second through holes 42. The second through holes 42 have a smaller diameter than the first through hole 41. In the first inner shaft 23A, the first through hole 41 is large enough that the base portion 35 of the first thick portion 33 is cut, so that the first through hole 41 has a necessary diameter. In the following description, of the thin portions 34, the thin portion 34 where the first through hole 41 is formed is referred to as first thin portion 34A, the thin portions 34 where the second through holes 42 are formed are referred to as second thin portions 34B, and the thin portions 34 where the second thick portions 37 are formed are referred to as third thin portions 34C. All of the first thin portion 34A, the second thin portions 34B, and the third thin portions 34C are the thin portions 34 formed in the regions each located between the bolt holes 28, 28 adjacent to each other in the circumferential direction. The first thin portion 34A and the second thin portions 34B are the thin portions 34 formed in the regions having no tapped hole 38 (first regions) out of the regions each located between the bolt holes 28, 28 adjacent to each other in the circumferential direction. The third thin portions 34C are the thin portions 34 formed in the regions having the tapped holes 38 (second regions) out of the regions each located between the bolt holes 28, 28 adjacent to each other in the circumferential direction.

In the first inner shaft 23A, the second thick portions 37 and the tapped holes 38 are not formed at equal intervals in the circumferential direction in the flange portion 27. Therefore, when considering only the second thick portions 37 and the tapped holes 38 (third thin portions 34C), the weight of the flange portion 27 is not balanced in the circumferential direction. In the first inner shaft 23A, the flange portion 27 has the plurality of thin portions 34 where the through holes 40 are formed (specifically, the first thin portion 34A and the second thin portions 34B) so that the position of the center of gravity of the flange portion 27 is located on the centerline CO. The weight of the flange portion 27 is thus balanced in the circumferential direction. In the first inner shaft 23A, the flange portion 27 has the plurality of types of through holes 40 with different diameters (first through hole 41 and second through holes 42). However, in the bearing device of the present disclosure, all of the plurality of through holes may have the same diameter. In order for the flange portion 27 to have enough rigidity, it is preferable that the portions of the flange portion 27 that are located radially outward of the through holes 40 have a thickness of 4 mm or more in the radial direction.

In the first inner shaft 23A, the one thin portion 34 located on the side where the circumferential interval between the two tapped holes 38, 38 is small is the first thin portion 34A where the first through hole 41 is formed, and the two thin portions 34, 34 located on the side where the circumferential interval between the tapped holes 38, 38 is large are the second thin portions 34B where the second through holes 42 are formed. In the first inner shaft 23A, the weight of the flange portion 27 is balanced in the circumferential direction by arranging the first thin portion 34A and the second thin portions 34B in this manner. In other words, in the first inner shaft 23A, in the case where the second thick portions 37 and the tapped holes 38 (third thin portions 34C) are unevenly distributed in the circumferential direction, the through holes 40 (first through hole 41 and second through holes 42) are formed so as to be unevenly distributed in the circumferential direction, so that the weight of the flange portion 27 is balanced in the circumferential direction. That is, in the first inner shaft 23A, providing the first thin portion 34A and the second thin portions 34B can reduce an increase in weight of the flange portion 27 and balance the weight of the flange portion 27 in the circumferential direction.

(Second Embodiment of Inner Shaft)

Figure 5:
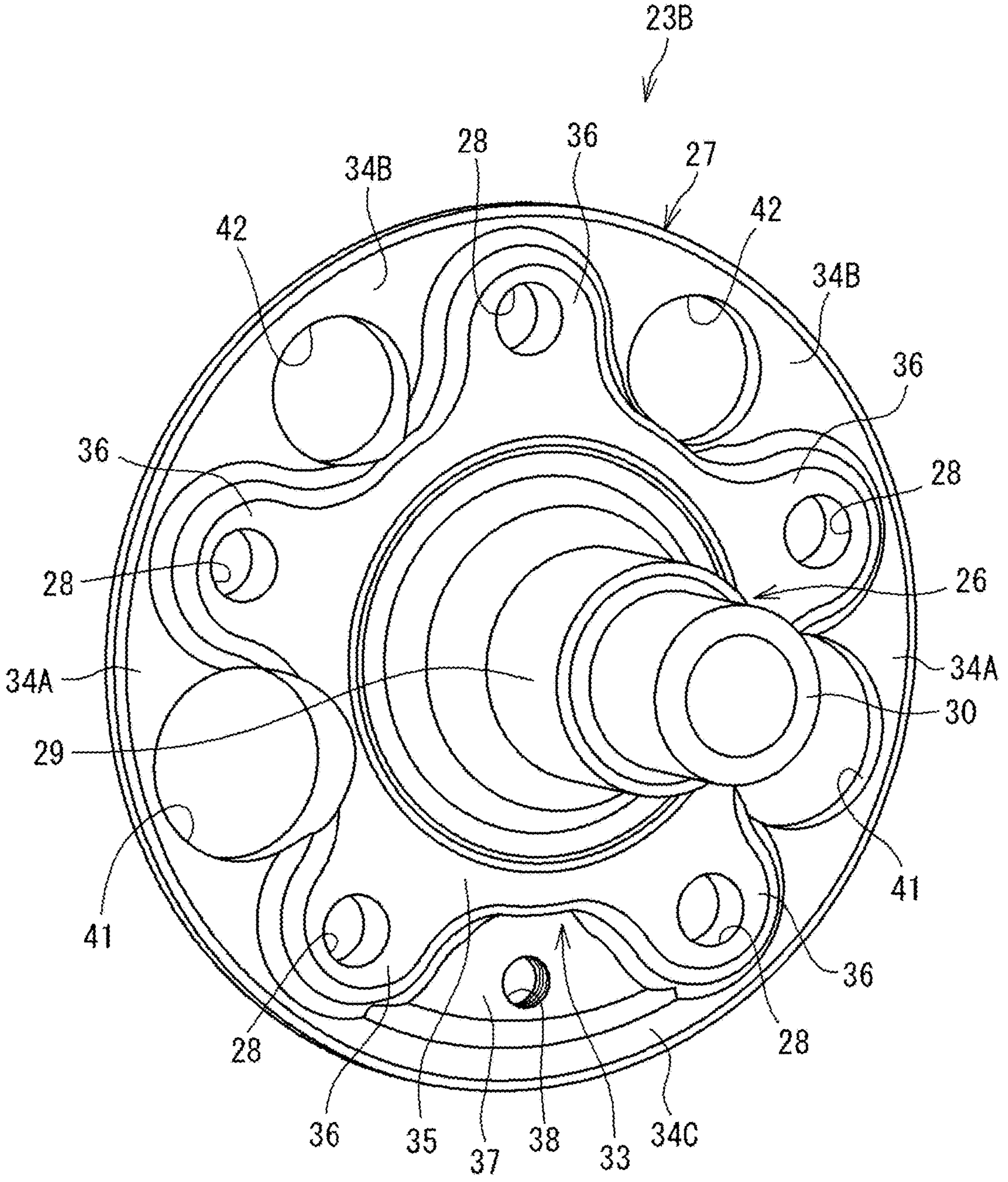
FIG. 5 is a perspective view of an inner shaft according to a second embodiment.
Figure 6:
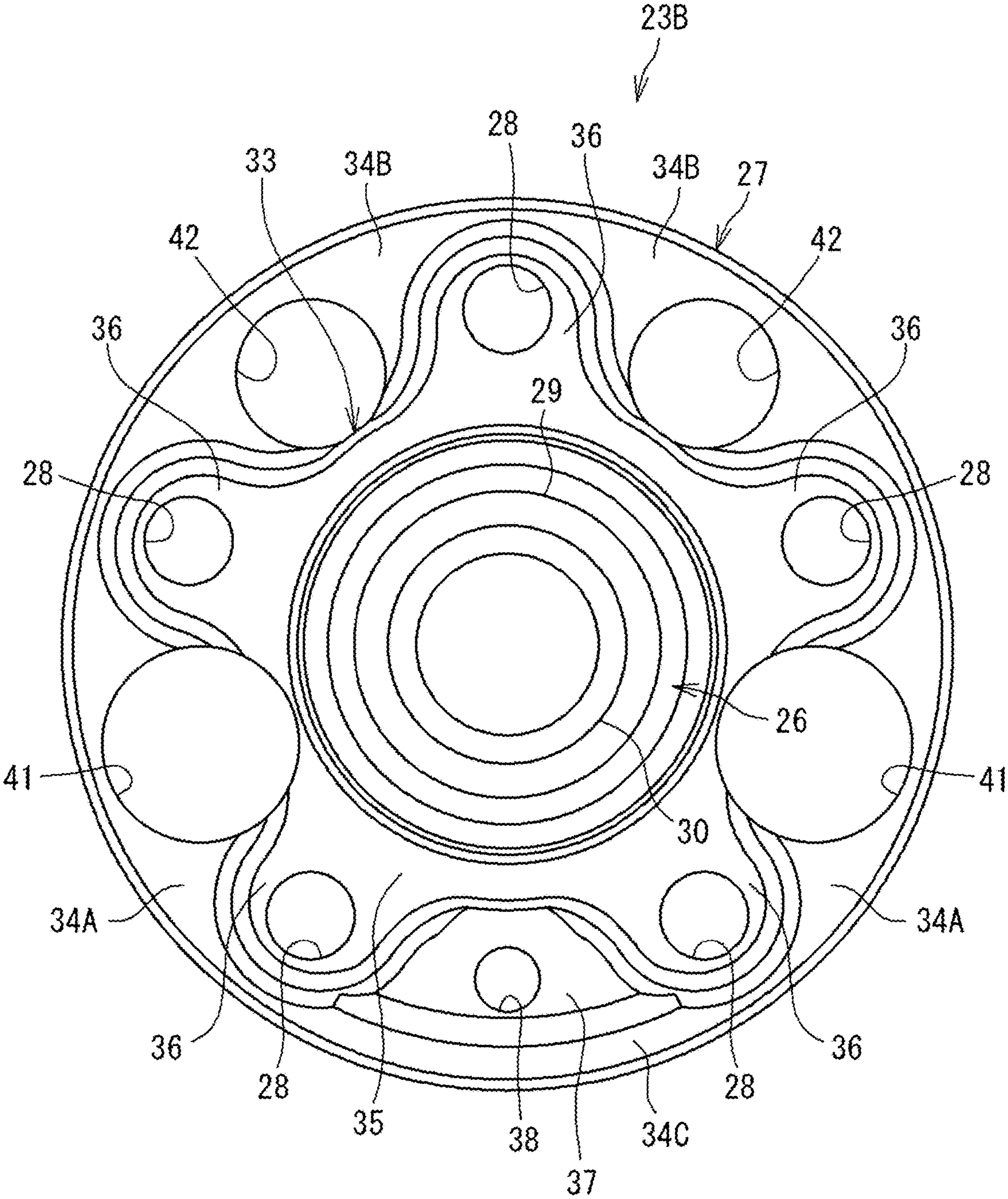
FIG. 6 is a diagram of the inner shaft according to the second embodiment as viewed in an axial direction.

FIG. 5 is a perspective view of the inner shaft 23 according to a second embodiment. FIG. 6 is a diagram of the inner shaft 23 according to the second embodiment as viewed in the axial direction. The inner shaft 23 in the bearing device 10 may be the inner shaft 23 according to the second embodiment shown in FIGS. 5 and 6 (hereinafter referred to as second inner shaft 23B). The portions of the second inner shaft 23B shown in FIGS. 5 and 6 that have the same configurations as the portions of the first inner shaft 23A are denoted by the same signs as the portions of the first inner shaft 23A, and description of such portions will be omitted unless otherwise specified.

As shown in FIGS. 5 and 6, the second inner shaft 23B has the same numbers of protruding portions 36 and thin portions 34 as the number of bolt holes 28 ("5" in the second inner shaft 23B), namely has five protruding portions 36 and five thin portions 34. In this respect, the second inner shaft 23B is the same in configuration as the first inner shaft 23A. The second inner shaft 23B has the same number of second thick portions 37 as the number of tapped holes 38 ("1" in the second inner shaft 23B), namely has one second thick portion 37. In this respect, the second inner shaft 23B is different in configuration from the first inner shaft 23A. The third thin portion 34C of the second inner shaft 23B is one of the five thin portions 34. In the second inner shaft 23B, only one second thick portion 37 is formed in the flange portion 27. In other words, in the second inner shaft 23B, one second thick portion 37 is provided in order to form one tapped hole 38 in the flange portion 27. In the second inner shaft 23B, providing the second thick portion 37 allows the tapped hole 38 to have enough strength.

In the second inner shaft 23B, the first thin portions 34A and the second thin portions 34B are provided in the (four) thin portions 34 other than the third thin portion 34C out of the five thin portions 34. In the second inner shaft 23B, a total of four through holes 40 including two first through holes 41 and two second through holes 42 are formed in the flange portion 27.

In the second inner shaft 23B, the two thin portions 34 located at a small distance from the tapped hole 38 are the first thin portions 34A, and the two thin portions 34 located at a great distance from the tapped hole 38 are the second thin portions 34B. In the second inner shaft 23B, the first thin portions 34A and the second thin portions 34B are arranged in this manner so that the weight of the flange portion 27 is balanced in the circumferential direction. That is, in the second inner shaft 23B, providing the first thin portions 34A and the second thin portions 34B reduces an increase in weight of the flange portion 27 and balances the weight of the flange portion 27 in the circumferential direction.

(Third Embodiment of Inner Shaft)

Figure 7:
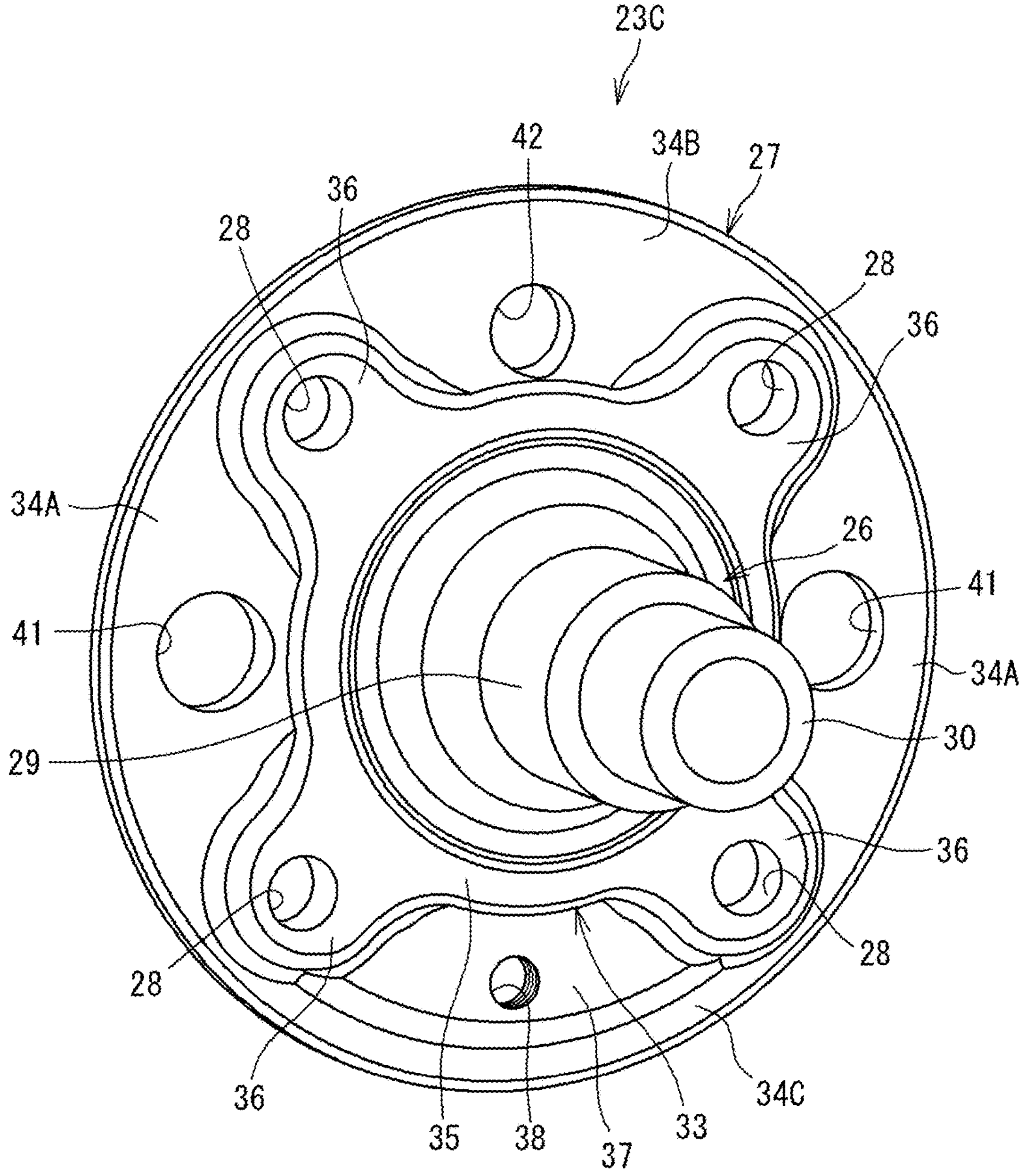
FIG. 7 is a perspective view of an inner shaft according to a third embodiment.
Figure 8:
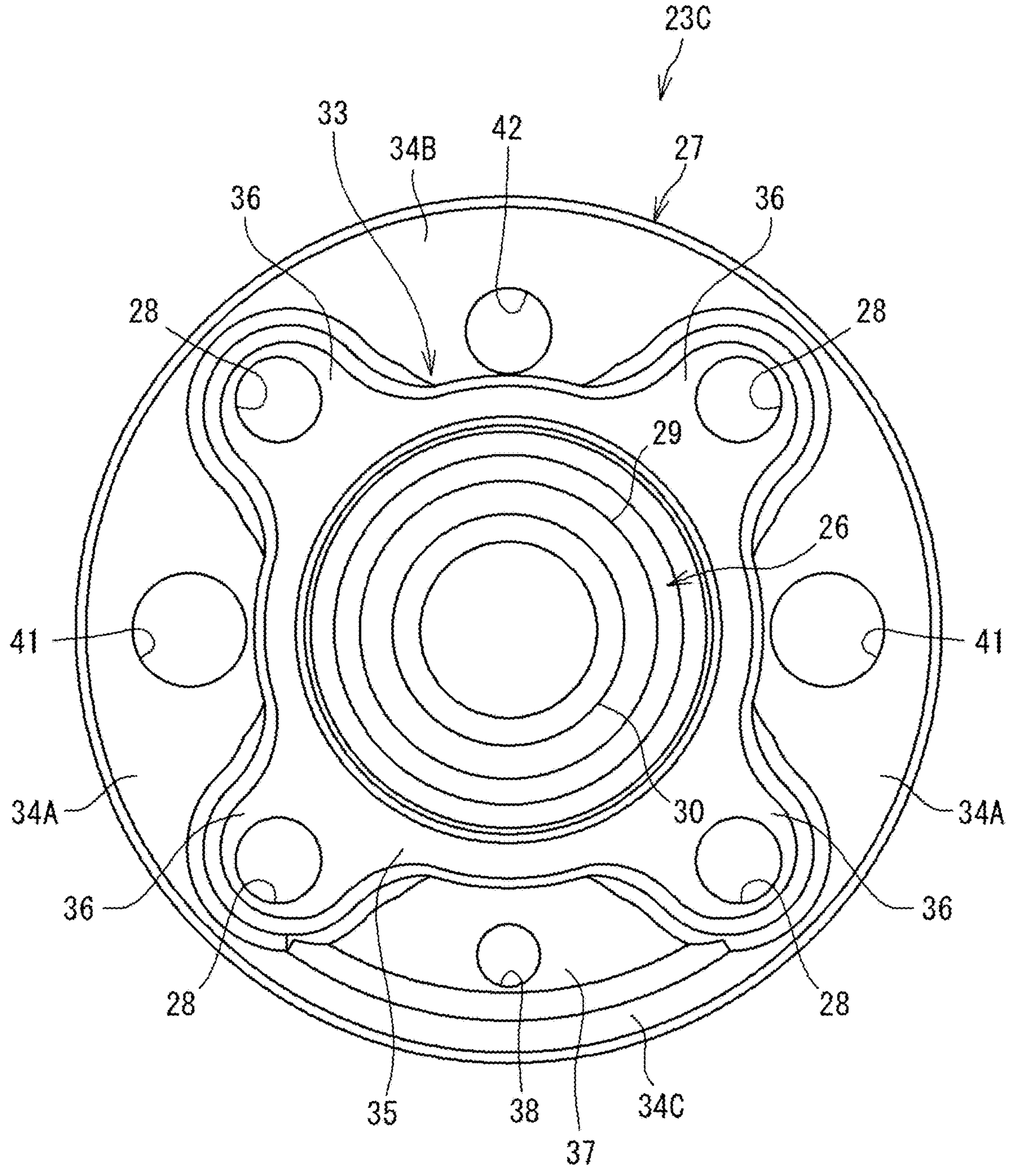
FIG. 8 is a diagram of the inner shaft according to the third embodiment as viewed in an axial direction.
Figure 9:
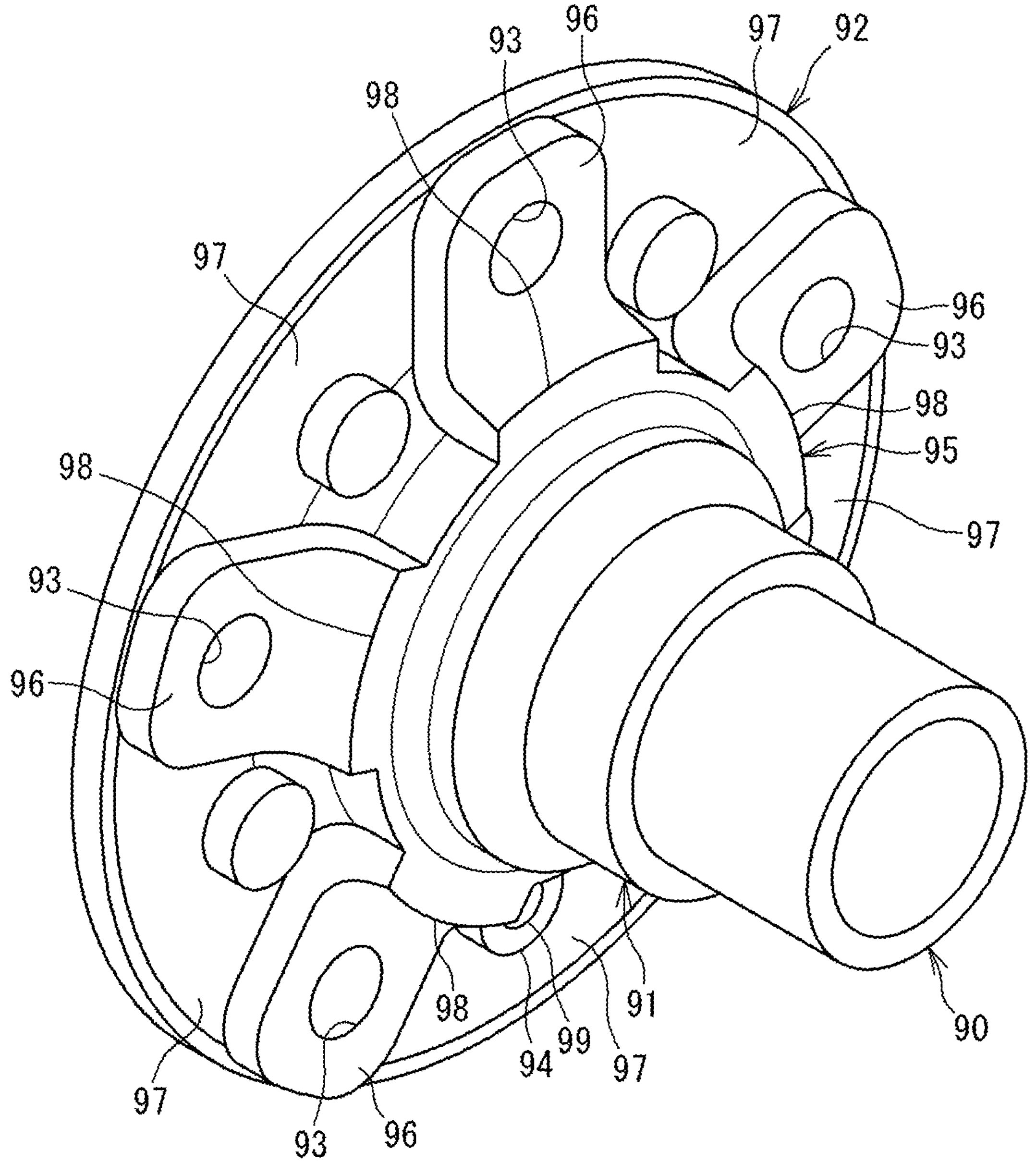
FIG. 9 is a perspective view of a conventional inner shaft.

FIG. 7 is a perspective view of the inner shaft 23 according to a third embodiment. FIG. 8 is a diagram of the inner shaft 23 according to the third embodiment as viewed in the axial direction. The inner shaft 23 in the bearing device 10 may be the inner shaft 23 according to the third embodiment shown in FIGS. 7 and 8 (hereinafter referred to as third inner shaft 23C). The portions of the third inner shaft 23C shown in FIGS. 7 and 8 that have the same configurations as the portions of the first inner shaft 23A and the second inner shaft 23B are denoted by the same signs as the portions of the first inner shaft 23A and the second inner shaft 23B, and description of such portions will be omitted unless otherwise specified.

As shown in FIGS. 7 and 8, the third inner shaft 23C has the same numbers of protruding portions 36 and thin portions 34 as the number of bolt holes 28 ("4" in the third inner shaft 23C), namely has four protruding portions 36 and four thin portions 34. In this respect, the third inner shaft 23C is different in configuration from the first inner shaft 23A and the second inner shaft 23B. The third inner shaft 23C has the same number of second thick portions 37 as the number of tapped holes 38 ("1" in the third inner shaft 23C), namely has one second thick portion 37. In this respect, the third inner shaft 23C is different in configuration from the first inner shaft 23A, and is the same in configuration as the second inner shaft 23B. The third thick portion 34C of the third inner shaft 23C is one of the four thin portions 34. In the third inner shaft 23C, only one second thick portion 37 is formed in the flange portion 27. In other words, in the third inner shaft 23C, one second thick portion 37 is provided in order to form one tapped hole 38 in the flange portion 27. In the third inner shaft 23C, providing the second thick portion 37 allows the tapped hole 38 to have enough strength.

In the third inner shaft 23C, the first thin portions 34A and the second thin portion 34B are provided in the (three) thin portions 34 other than the third thin portion 34C out of the four thin portions 34. In the third inner shaft 23C, a total of three through holes 40 including two first through holes 41 and one second through hole 42 are formed in the flange portion 27.

In the third inner shaft 23C, the two thin portions 34 located at a small distance from the tapped hole 38 are the first thin portions 34A, and the one thin portion 34 located at a great distance from the tapped hole 38 is the second thin portion 34B. In the third inner shaft 23C, the first thin portions 34A and the second thin portion 34B are arranged in this manner so that the weight of the flange portion 27 is balanced in the circumferential direction. That is, in the third inner shaft 23C, providing the first thin portions 34A and the second thin portion 34B reduces an increase in weight of the flange portion 27 and balances the weight of the flange portion 27 in the circumferential direction.

In the inner shaft 23 having four bolt holes 28 like the third inner shaft 23C, it is possible to form two second thick portions 37 and two tapped holes 38 in the thin portions 34 that are 180 degrees out of phase in the circumferential direction. In this case, the weight of the flange portion 27 can be balanced in the circumferential direction by evenly distributing the second thick portions 37 in the circumferential direction of the flange portion 27. In this case, the weight of the flange portion 27 may be reduced by forming the through holes 40 in the remaining two thin portions 34 where the second thick portions 37 and the tapped holes 38 are not formed.

Functions and Effects of Embodiments

The bearing device 10 according to the embodiments described above includes: the outer ring 12; the inner shaft 23 including, on its one side in the axial direction, the flange portion 27 having the plurality of bolt holes 28 for fixing to the wheel and the tapped hole(s) 38 for fixing a brake rotor; and the plurality of balls 13 arranged between the outer ring 12 and the inner shaft 23. The flange portion 27 includes: the thin portions 34 located in the first regions each having the through hole 40 extending through the first region in the axial direction and having no tapped hole 38 and the second region(s) having the tapped hole 38, the first and second regions being regions each located between the bolt holes 28 adjacent to each other in the circumferential direction; the first thick portion 33 including the regions around the bolt holes 28 that are raised from the thin portions 34 toward the other side in the axial direction; and the second thick portion(s) 37 that is the region(s) around the tapped hole(s) 38 that is raised from the thin portion(s) 34 in the second region toward the other side in the axial direction.

In the bearing device 10 having such a configuration, providing the second thick portion(s) 37 allows the tapped hole(s) 38 to have enough strength, and forming the through holes 40 reduces an increase in weight of the flange portion 27 and balances the weight of the flange portion 27 in the circumferential direction. Therefore, according to such a configuration, it is possible to allow the tapped hole(s) 38 to have enough strength while reducing an increase in weight of the flange portion 27 and balancing the weight of the flange portion 27 in the circumferential direction in the bearing device 10.

In the bearing device 10 according to the embodiments described above, the first thick portion 33 includes: the annular base portion 35 located on the radially inner side; and the protruding portions 36 protruding radially outward in a radial pattern from the base portion 35, the protruding portions 36 being the regions around the bolt holes 28 that are raised from the thin portions 34 toward the other side in the axial direction. The second thick portion(s) 37 is connected on its both sides in the circumferential direction to the protruding portions 36 of the first thick portion 33. With this configuration, the strength of the second thick portion(s) 37 can be increased. It is therefore possible to reduce distortion of the tapped hole(s) 38 that is caused by the weight of the brake rotor when the brake rotor is temporarily fixed to the flange portion 27.

The bearing device 10 according to the embodiments described above includes, as the thin portions 34 in the first regions, the first thin portion(s) 34A having the first through hole 41 and the second thin portion(s) 34B having the second through hole 42 with a smaller diameter than the first through hole 41. With this configuration, the weight of the flange portion 27 can be balanced in the circumferential direction.

The first inner shaft 23A of the bearing device 10 according to the embodiment described above has two tapped holes 38, the first thin portion 34A is located on the side where the circumferential interval between the tapped holes 38 is small, and the second thin portions 34B are located on the side where the circumferential interval between the tapped holes 38 is large. With this configuration, the weight of the flange portion 27 having the two tapped holes 38 can be balanced in the circumferential direction.

The second inner shaft 23B and the third inner shaft 23C of the bearing device 10 according to the embodiments described above have one tapped hole 38, and the second thin portion(s) 34B is located farther away in the circumferential direction from the second thick portion 37 than the first thin portions 34A are. With this configuration, the weight of the flange portion 27 having the one tapped hole 38 can be balanced in the circumferential direction.

In the bearing device 10 according to the embodiments described above, the axial dimension D2 of the second thick portion(s) 37 is smaller than the axial dimension D1 of the first thick portion 33. With this configuration, an increase in weight of the flange portion 27 can be reduced.

In the bearing device 10 according to the embodiments described above, the second thick portion(s) 37 is connected on its radially inner side to the base portion 35 of the first thick portion 33. With this configuration, the strength of the second thick portion(s) 37 can further be increased.

The embodiments disclosed herein are illustrative in all respects and not restrictive. The scope of the present invention is not limited to the above embodiments, and is intended to include all modifications within the scope equivalent to that of the configurations described in the claims. For example, although the rolling elements are described as the balls 13, the rolling elements may be rollers (tapered rollers).

The invention claimed is:

1. A wheel bearing device, comprising:
an outer member;
an inner member including, on one side in an axial direction of the inner member, a wheel mounting flange having a plurality of bolt holes provided at intervals in a circumferential direction in order to fix to a wheel and a tapped hole for fixing a brake rotor; and
a plurality of rolling elements arranged between the outer member and the inner member, wherein:
the wheel mounting flange includes
a first region between the bolt holes adjacent to each other in the circumferential direction and that does not have the tapped hole,
a second region between the bolt holes adjacent to each other in the circumferential direction and that has the tapped hole,
portions of a first thickness located in the first region and the second region,
a portion of a second thickness including regions around the bolt holes, the second thickness being greater than the first thickness, and
a portion of a third thickness around the tapped hole in the second region, the third thickness being greater than the first thickness;
a through hole for balancing a weight of the wheel mounting flange in the circumferential direction is provided in the first region, the through hole extending through the first region in the axial direction; and
the through hole is not provided in the second region.

2. The wheel bearing device according to claim 1, wherein
the portion of the second thickness includes an annular base portion located on a radially inner side of the portion of the second thickness, and protruding portions protruding radially outward in a radial pattern from the base portion, the protruding portions being the regions around the bolt holes, and
the portion of the third thickness is connected on both sides in the circumferential direction to the protruding portions.

3. The wheel bearing device according to claim 1, wherein
the wheel mounting flange includes, as the portions of the first thickness in the first region, a first portion having a first through hole and a second portion having a second through hole with a smaller diameter than the first through hole.

4. The wheel bearing device according to claim 3, wherein
the wheel mounting flange has two tapped holes,
a first interval between the tapped holes is smaller than a second interval between the tapped holes,
the first portion is located on a side where the first interval is located, and
the second portion is located on a side where the second interval is located.

5. The wheel bearing device according to claim 3, wherein
the wheel mounting flange has one tapped hole, and
the second portion is located farther away in the circumferential direction from the portion of the third thickness than the first portion.

6. The wheel bearing device according to claim 1, wherein
an axial dimension of the portion of the third thickness is smaller than an axial dimension of the portion of the second thickness.

7. The wheel bearing device according to claim 2, wherein
the portion of the third thickness is connected to the base portion on a radially inner side of the portion of the third thickness.

* * * * *